United States Patent [19]

Poll

[11] Patent Number: 5,297,352
[45] Date of Patent: Mar. 29, 1994

[54] DECORATIVE GLASS BODY

[75] Inventor: Martin Poll, Fritzens, Austria

[73] Assignee: D. Swarovski & Co., Wattens, Austria

[21] Appl. No.: 102,492

[22] Filed: Aug. 5, 1993

Related U.S. Application Data

[63] Continuation of Ser. No. 648,294, Jan. 29, 1991, abandoned.

[30] Foreign Application Priority Data

Jan. 31, 1990 [DE] Fed. Rep. of Germany ....... 4002819

[51] Int. Cl.⁵ .............................................. G09F 19/12
[52] U.S. Cl. ......................................... 40/427; 40/453; 472/68
[58] Field of Search ............... 40/427, 1, 446, 453, 40/152; 359/831, 833, 834; 472/61, 68; D16/137; D21/241

[56] References Cited

U.S. PATENT DOCUMENTS

| | | | |
|---|---|---|---|
| 2,572,454 | 10/1951 | Down et al. | 40/152 X |
| 3,084,596 | 4/1963 | Radin | 359/833 |
| 3,364,603 | 1/1968 | Tate et al. | 359/831 X |
| 3,658,413 | 4/1972 | Cornell | 40/152 X |
| 4,180,930 | 1/1980 | DiMatteo | |
| 4,593,876 | 6/1986 | Greiner | |

FOREIGN PATENT DOCUMENTS

| | | |
|---|---|---|
| 577828 | 5/1933 | Fed. Rep. of Germany . |
| 1961766 | 6/1967 | Fed. Rep. of Germany . |
| 2252743 | 5/1974 | Fed. Rep. of Germany . |
| 560412 | 10/1923 | France . |
| 1452954 | 10/1976 | United Kingdom . |

OTHER PUBLICATIONS

Europäischer Recherchenbericht Search Report No. EP 91 10 0778, dated Jun. 12, 1992.
"Optical Properties of Glass," by Ivan Fanderlik, from *Glass Science and Technology 5*, pp. 232–333, 1993.

Primary Examiner—Kenneth J. Dorner
Assistant Examiner—J. Silbermann
Attorney, Agent, or Firm—Fish & Richardson

[57] ABSTRACT

A decorative glass body for viewing objects that are disposed on the base surface of the decorative glass body but seem to be floating inside the glass.

24 Claims, 2 Drawing Sheets

DECORATIVE GLASS BODY

This application is a continuation of U.S. application Ser. No. 07/648,294, filed Jan. 29, 1991, now abandoned.

BACKGROUND OF THE INVENTION

1. Field of the Invention

The present invention relates to a decorative glass body characterized by special optical effects.

2. Discussion of the Related Art

Decorative bodies made of glass and other materials and intended to be placed on desks, for example, are known in many embodiments. However, there is always a need for new decorative elements, in particular if they have new, hitherto unknown effects.

SUMMARY OF THE INVENTION

The invention is based on the problem of providing a new decorative glass body characterized by special optical effects.

The object of the invention is a decorative glass body for viewing objects wherein an object is disposed on the base surface, the viewing surface is located opposite the base surface, and the side surface facing the viewer and located between the base surface and the viewing surface is on a slant to the viewer in such a way that the entire object is visible through the viewing surface in a predetermined viewing angle range whereby the viewing direction is on a slant to the viewing surface.

The object provided on the base surface is preferably visible only through the first viewing surface, not through other surfaces of the decorative glass body.

Obviously, the optical effects change when the viewing angle changes. For the purposes of description, however, a given viewing angle or a preferable viewing direction is assumed here, as results for example when the decorative glass body is located on the desk at a certain distance from the viewer and the viewer is seated at the desk.

A first advantage is that the viewer sees the object at a steeper angle, and thus better, than if the glass body were not located above the object. This is due to the fact that the glass, in particular lead crystal, refracts the ray of light to the vertical.

A special optical effect results from the fact that the object, for example the clock, seems to be floating in the decorative glass body, whereby the height at which the object seems to float in the glass body changes when the viewing angle changes.

According to a preferred embodiment, a second object is disposed on a back surface of the decorative glass body. It is likewise visible through a corresponding viewing surface and preferably not through the other surfaces of the decorative glass body.

This second object is subject to the same optical effects, namely that it seems to be floating in the decorative glass body and its position changes with the viewing angle.

According to a preferred embodiment, the decorative glass body is formed in such a way that both objects are seen simultaneously and in about the same size in the preferable viewing direction. This is the case in particular when the area projection of the first viewing surface and the second viewing surface perpendicular to the line of sight are of approximately equal size at a given viewing angle.

According to a preferred embodiment, the objects and the corresponding viewing surfaces lie in parallel planes.

A preferred design of the decorative glass body is the form of an oblique quadrangular prism. However, there are no limits on the variety of forms. One can design decorative glass bodies with prism faces, pyramid faces or faces of other three-dimensional bodies. There are also no limits on the type and number of objects provided.

The invention shall be explained in more detail below with reference to the drawings showing exemplary embodiments.

DETAILED DESCRIPTION OF THE PREFERRED EMBODIMENT

Figure 1:
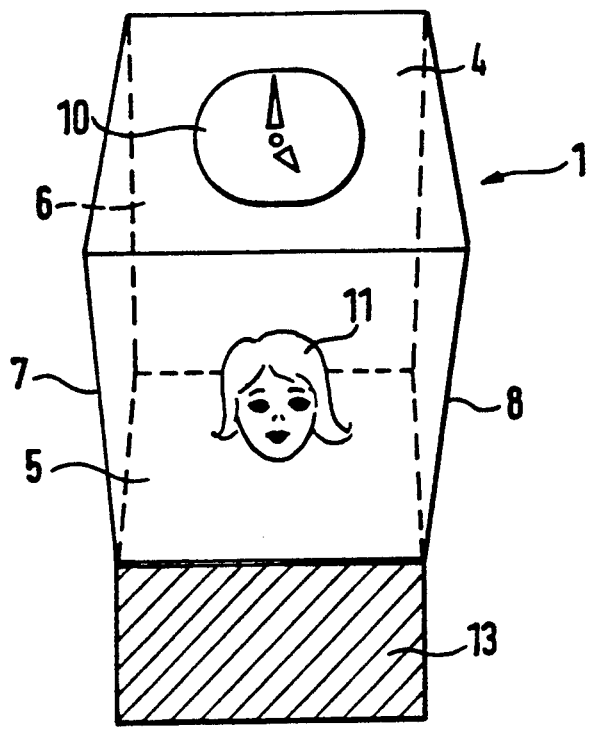
FIG. 1 shows a view of a decorative glass body regarded obliquely from above and from the front.

In FIG. 1 one sees first object 10 through first viewing surface 4 obliquely from above and from the front in accordance with the preferable viewing direction. Object 10 is in this case a clock, an object that is particularly suitable for the inventive decorative glass body. Clock 10 is housed in base 13, more precisely in bore 14, as can be see in FIG. 2. The clock can be operated easily from below.

Through second viewing surface 5 one can see a second object 11 located on back surface 6 of the decorative glass body. This second object can for example be a picture or a photograph that is disposed in a holding means 15 on back surface 6. This provides a possibility of replacement.

When the decorative glass body is regarded approximately in the preferable viewing direction, as shown by way of example by rays of light 17, 17' and 18, 18', the viewer sees both objects 10 and 11 simultaneously, whereby both objects seem to be floating in the glass body.

Lines of sight 17, 17' also document why the viewer sees first object 10 through decorative glass body 1 better than without a glass body, namely because the rays of light are refracted by the lead crystal to the vertical so that the viewing angle is steeper.

This law is also the basis for the form of the decorative glass body. Since the entire first object 10 is to be regarded by the viewer in the preferable viewing direction it is necessary for corresponding first viewing surface 4 of the decorative glass body 1 to be shifted a certain distance toward the viewer. That is, side surface 5 facing the viewer and located between the base surface 3 and viewing surface 4 is on a slant to the viewer and an acute angle is formed between the side surface 5 and the viewing surface. This is clearly indicated by lines of sight 17, 17' in FIG. 2. This distance evidently depends on the refractive index of the glass and thus on angles a and B, and on the distance between first object 10 and corresponding first viewing surface 4.

Figure 2:
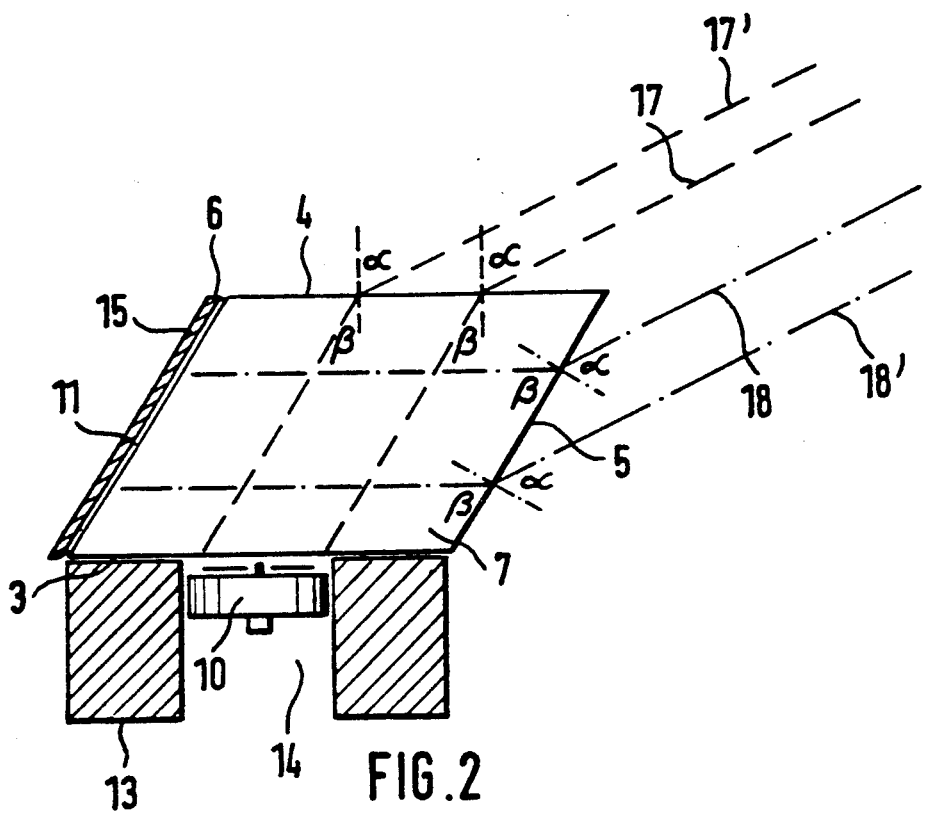
FIG. 2 shows a sectional side view of the decorative glass body of FIG. 1.

According to a preferred embodiment, the inventive decorative glass body is designed as an oblique quadrangular prism as shown in the FIGS. 1 and 2. The prism angles are preferably fixed in such a way that the angle of incidence of the lines of sight is smaller than the limiting angle of the total reflection over the total area of the object planes, namely base surface 3 and back surface 6. Objects 10 and 11 are then visible through viewing surfaces 4 and 5 even if they are not in optical contact with the prism faces but are separated from them by air.

If the refractive index of the glass of the decorative body is greater than $\sqrt{2}$, total reflection always occurs on base surface 3 and back surface 6 when the body is viewed through side surfaces 7, 8, so that objects 10, 11 spaced from the surfaces are inaccessible to viewing through side surfaces 7, 8.

Figure 3:
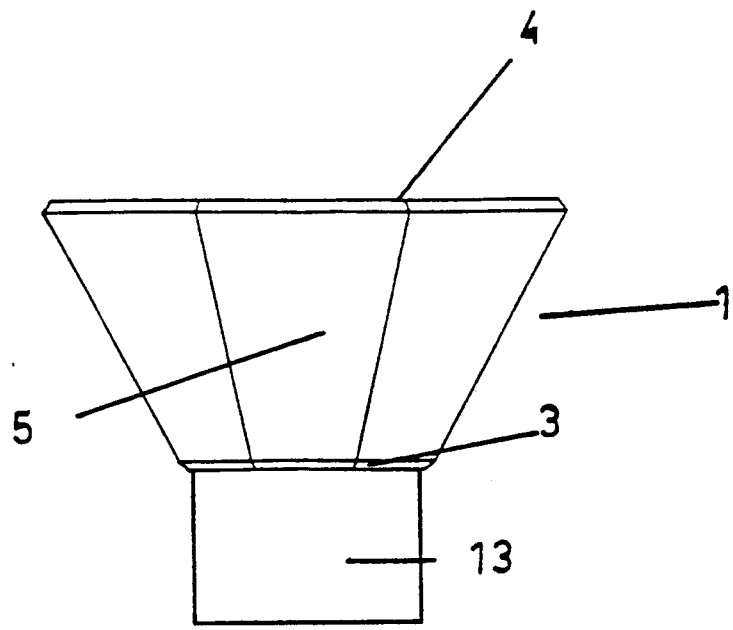
FIG. 3 shows a pyramidal decorative glass body from the side.
Figure 4:
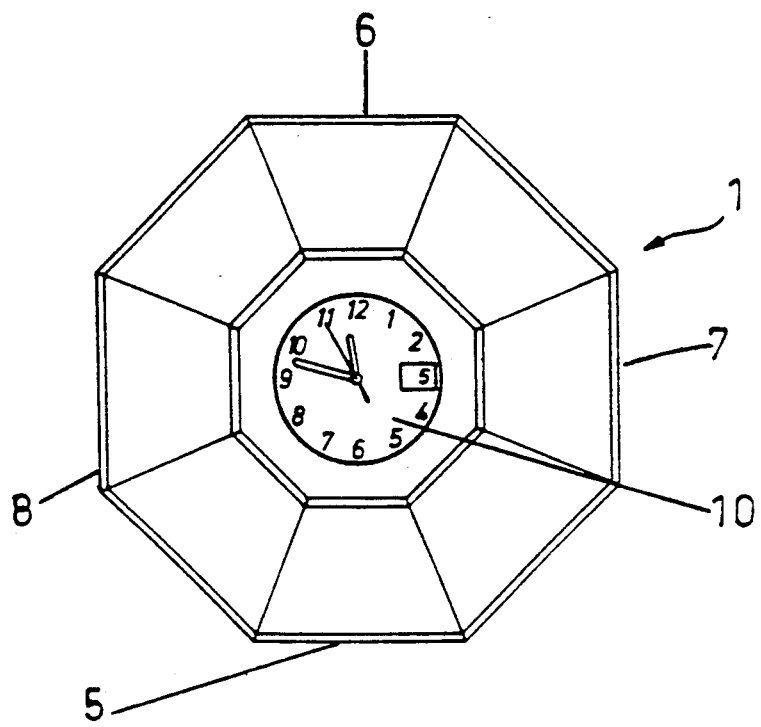
FIG. 4 shows the decorative glass body of FIG. 3 from the top.

FIGS. 3 and 4 show a pyramidal decorative glass body 1. On base surface 3 an object 10, for example a clock, is disposed in a base 13. Viewing surface 4 is parallel to base surface 3. Side surface 5 is on a slant to the viewer. On opposite back side surface 6 a second object 11 (not shown) may be disposed. One may also dispose further objects 12 (not shown) on further side surfaces 7, 8.

The inventive decorative glass body can have a great variety of forms. However, it is preferable for the object surfaces and viewing surfaces to lie in parallel planes.

For many objects, for example clocks, it is preferable to provide on the base surface a base in which the object can be disposed.

The objects may be replaceable.

The preferable material for the decorative glass body is lead crystal that is cut and polished.

I claim:

1. A decorative glass body for viewing at least one object, comprising
    a base surface of said body on which the object is disposed,
    a viewing surface of said body opposite said base surface,
    a side surface of said body between said base surface and said viewing surface,
    wherein said viewing surface and said base surface are parallel, an acute angle is formed between said side surface and said viewing surface such that the object is visible through said viewing surface when viewed at an angle oblique to said viewing surface.

2. The decorative glass body of claim 1, further comprising a back surface of said body,
    wherein said back surface is disposed relative to said side surface such that when the object on said base surface is visible through said viewing surface, a second object on said back surface is visible through said side surface.

3. The decorative glass body of claim 2, wherein said back surface and said side surface are parallel.

4. The decorative glass body of claim 3, wherein said body is an oblique quadrangular prism.

5. The decorative glass body of claim 3, wherein said base surface has the object replaceably disposed thereon.

6. The decorative glass body of claim 2, wherein said body is an oblique quadrangular prism.

7. The decorative glass body of claim 2, wherein an area projection of said viewing surface and an area projection of a side wall perpendicular to a line of sight to said viewing surface and said side surface are of equal size at a viewing angle.

8. The decorative glass body of claim 2, wherein said body is an inverted truncated pyramid.

9. The decorative glass body of claim 2, wherein the object is visible only through said viewing surface and said second object is visible only through sand side surface.

10. The decorative glass body of claim 2, wherein said body comprises cut lead crystal.

11. The decorative glass body of claim 2, wherein said base surface has the object replaceably disposed thereon.

12. The decorative glass body of claim 2, wherein said back surface has said second object replaceably disposed thereon.

13. The decorative glass body of claim 2, wherein said base surface has said object replaceably disposed thereon and said back surface has the second object replaceably disposed thereon.

14. The decorative glass body of claim 1, wherein said body is an oblique quadrangular prism.

15. The decorative glass body of claim 1, wherein said body is an inverted truncated pyramid.

16. The decorative glass body of claim 1, wherein the object is visible only through said viewing surface.

17. The decorative glass body of claim 1, wherein said body comprises cut lead crystal.

18. The decorative glass body of claim 1, wherein said base surface has the object replaceably disposed thereon.

19. The decorative glass body of claim 1, wherein when said object on said base surface is visible to a viewer through said viewing surface, at least one other object is simultaneously visible to said viewer through said side surface.

20. A decorative glass body for viewing two objects at the same time, comprising
    a base surface of said body on which the first object is disposed,
    a viewing surface of said body opposite said base surface,
    a side surface of said body between said base surface and said viewing surface,
    a back surface of said body between said base surface and said viewing surface on which the second object is disposed,
    wherein said base surface and said viewing surface are parallel, said side surface is disposed at an angle relative to said viewing surface such that the first object is visible through said viewing surface when viewed at an angle oblique to said viewing surface, said back surface is disposed relative to said side surface such that when the first object is visible through said viewing surface, the second object is visible through said side surface, and said body comprises an oblique quadrangular prism.

21. The glass body of claim 20, wherein said body comprises cut lead crystal.

22. The decorative glass body of claim 20, wherein said base surface has the first object replaceably disposed thereon.

23. The decorative glass body of claim 20, wherein said back surface has the second object replaceably disposed thereon.

24. The decorative glass body of claim 20, wherein said base surface has the first object replaceably disposed thereon and said back surface has the second object replaceably disposed thereon.

* * * * *